_Patented Apr. 24, 1951_

2,550,656

UNITED STATES PATENT OFFICE 2,550,656

ICE CREAM MANUFACTURE

John W. Knechtges, Chicago, Ill., assignor, by mesne assignments, to Swift & Company, a corporation of Illinois No Drawing. Application June 5, 1947, Serial No. 752,833

6 Claims. (Cl. 99—131)

This invention relates in general to a method of making improved food products and more particularly to a method of making improved frozen food products containing whole fruit.

When attempting to prepare a smooth, palatable, and eye appealing ice cream product containing the whole fruit, considerable difficulty is encountered because the fruit and the juice thereof tend to become crystalline during the freezing operation and subsequent storage period. To partially overcome this difficulty, it has been standard practice to avoid putting the whole fruit into the freezer.

Frequently a puree of the fruit is made and either added to the ice cream mix prior to freezing or injected into the ice cream after freezing by means of a fruit feeder. Since the pureed fruit does not have the same eye appeal as the whole fruit, some ice cream manufacturers add part of the fruit in the pureed form and part in the whole form. This latter method, however, is not entirely satisfactory, since part of the desired eye appealing quality is lost and an objectionable amount of crystallization in the whole fruit is still evident.

According to another method of handling fruit for use in a continuous process for manufacturing ice cream, the fruit juice is separated from the fruit and the juice discarded. While this practice may reduce the amount of crystallization somewhat, much of the flavor is thereby lost and certain of the soluble vitamins are also lost. Moreover, despite this latter practice the whole fruit still becomes crystalline.

Attempts have been made to overcome the foregoing and other objections by adding certain homogenizing substances to the ice cream mix which may or may not contain fruit and the juice thereof. These processes, however, fail to provide a satisfactory method of stabilizing the whole fruit so as to substantially eliminate the formation of ice crystals in the frozen product containing whole fruit.

An object of this invention is to provide a method of preparing an improved frozen food product containing whole fruit whereby the formation of ice crystals in the frozen product is eliminated.

Another object of the invention is to provide a method of preparing an improved whole fruit flavored ice cream product having superior smoothness, flavor, appearance, and natural vitamin content.

Still another object of this invention is to provide a method of treating whole fruit and the juice thereof which are used in the manufacture of frozen food products whereby the formation of ice crystals in the frozen products is eliminated.

Further objects of this invention will become apparent from the description and claims which follow.

It has been discovered that an improved frozen food product such as ice cream containing whole fruit as an ingredient thereof may be prepared by treating the whole fruit prior to adding the fruit to the ice cream according to the present invention. In the preferred embodiment of this invention, the fruit juice is first separated from the whole fruit by screening or by any conventional method which does not pulp or crush the whole fruit. To a quantity of the separated juice at least sufficient to cover the whole fruit is added a mixture consisting of approximately 0.2 per cent to 3.0 per cent of a gel-forming substance calculated on the weight of the combined fruit, juice, and added sugar. The gel-forming substance is admixed with approximately 5 parts of sugar for each part of the gel-forming substance in order to aid in dispersing the gel-forming substance throughout the juice. The juice and gel-forming mixture are heated to not more than 200° F. and preferably below 180° F. until the gel-forming substance is evenly dispersed throughout the juice. The additional sugar necessary to produce the desired flavor is preferably added subsequent to the heating step in order to obtain the desired dispersion and gel consistency. The stabilized juice is then poured over the whole fruit so as to cover the fruit and the mixture is preferably kept in a cooler overnight or until a slight gel structure is formed. The stabilized fruit and juice product is then ready for use and may be used, for example, in a batch or continuous process for the manufacture of ice cream or other frozen food product.

In the manufacture of ice cream according to the present invention the sugared whole fresh fruit is allowed to stand or the whole processed fruit in the form of a fruit pack, such as the "4+1" or "4 plus 1" fruit pack, is allowed to fully defrost so that a substantial amount of fruit juice syrup is formed. Those skilled in the art understand that a "4+1" fruit pack consists of four parts of fruit for one part of sugar; or in other words, the mixture consists of approximately 20 per cent sugar. The fruit and juice are then stabilized according to the method outlined, and the stabilized products are added to an ice cream mix which may be frozen in a batch or continuous freezer.

Although it is possible to incorporate the combined stabilized juice and fruit directly in the ice cream mix or subsequently through the fruit feeder, a superior product is obtained if the stabilized juice is separated from the stabilized whole fruit. The stabilized juice is then added to the basic ice cream mix in the univat and the stabilized whole fruit is added to the frozen ice cream through the fruit feeder. By adding the stabilized fruit and juice in the foregoing manner, all of the stabilizer customarily contained in the basic mix can be incorporated into the ice cream by means of the stabilized juice. In this manner an ice cream of greatly improved consistency and flavor is produced.

The amount of stabilized fruit and juice added to the ice cream varies with the kind of fruit used and the type of product desired. It has been found, however, that when approximately thirty pounds of combined stabilized fruit and juice are used for every ten gallons of basic ice cream mix, a highly satisfactory product is obtained. When adding the stabilized fruit and juice separately, care should be exercised in adding the juice and whole fruit in approximately the same proportions as these are obtained from the stabilization process.

Just as with the wide variation permissible with the amount of stabilized fruit and juice employed, the composition of the basic mix may vary depending on the type of product desired. A typical composition of a basic ice cream mix which may be employed with the stabilized whole fruit and juice is as follows:

14.1% milk fat
9.5% milk solids, not fat
13.0% sucrose
6.0% corn sugar

If desired, a fruit color may be added to this mix along with the stabilized juice.

The following specific examples will further illustrate the present invention but should not be construed to limit the scope thereof:

Example I 100 pounds of "4+1" pack whole strawberries and the juice thereof are strained and the fruit and juice collected in separate containers. The separated juice which is always sufficient to cover the separated whole strawberries is placed in a steam kettle or vat and slowly heated. When the temperature has reached approximately 150° F. a dry mixture consisting of approximately 0.6 pound of carrageen extract containing approximately 0.5 per cent added potassium salt and approximately 3.0 pounds of sugar is slowly added while the fruit juice is agitated. The juice and mixture are then heated to approximately 160° F. and held at this temperature for approximately 10 minutes in order to hydrate and thoroughly disperse the carrageen throughout the juice. Additional sugar is then dissolved in the juice to make the final sugar content equivalent to that of a "2+1" pack. The mixture is then cooled to approximately 90° F. and the stabilized strawberry juice is poured over the whole strawberries. The combined whole berries and stabilized juice are placed in a cooler at approximately 28° to 33° F. and allowed to remain for approximately 24 hours; whereupon a slight gel or "set" is formed. The stabilized fruit and juice are then separated and may be added to a freezer. From the 100 pounds of stabilized strawberries and juice approximately 70 per cent juice and 30 per cent whole berries are obtained. The stabilized whole fruit and juice are preferably added at a rate of 21 pounds of stabilized juice to the mix and 9 pounds of stabilized fruit by means of a fruit feeder for every 10 gallons of basic ice cream mix. A smooth ice cream product results which is substantially free of objectionable crystallization.

Example II 50 pounds of "3+1" pack whole raspberries and the juice thereof are separated into juice and the fruit by any of the conventional methods which do not crush the whole berry. To the separated juice, heated to 180° F., is then added approximately 0.35 pound of carob gum mixed with approximately 1.5 pounds of sugar so as to more easily disperse the gum throughout the juice. Additional sugar may be added if desired. The whole raspberries are then covered with the stabilized juice which is allowed to remain in contact with the fruit for approximately 16 hours; whereupon the juice and berries form a slight gel. The raspberries and juice are now stabilized and may be added to a freezer as desired.

Example III

To 100 pounds of processed "2+1" pack cherries and the juice thereof, heated to approximately 140° F., is added a mixture consisting of approximately 1.5 pounds of gum karaya and approximately 7.5 pounds of sugar and allowed to stand for approximately 24 hours or longer. At the end of the 24-hour period a slight gel has generally formed and the stabilized fruit and juice may then be incorporated in the ice cream as desired without the formation of objectionable crystallization.

Example IV 25 pounds of "3+1" peach pack were strained and the juice heated to 160° F. About 0.10 pound of carrageen was added and the mixture heated to 175° F. The stabilized juice was then poured back over the peaches, stirred well and permitted to stand in a cooler overnight. Approximately 18.5 pounds of stabilized peaches are used for every 10 gallons of ice cream mix.

The carrageen extract employed in the preferred embodiment of the invention is the conventional extract of Irish moss containing added alkali metal salts, such as potassium chloride, for the purpose of delaying the time of "set" of the gel and increasing the internal strength and texture of the said gel. As the Irish moss extract hydrates completely at relatively low temperatures (140–150° F.) and complements the fruit flavor, its use as a stabilizer is most desirable. As little as 0.2 per cent carrageen may be employed to stabilize the whole fruits and the juices thereof.

Although the carrageen product is particularly effective in the present process, many gums or gum-like substances are satisfactory and may be employed in the said process. Thus, for example, the following gums or gum-like substances have the property of forming a slight gel when used within the specified limits and may be employed in the present invention: gelatin, pectin, carrageen, Irish moss, carob gum, gum karaya, sodium alginate, gum arabic, alginic acid, and other substances having properties equivalent to the foregoing substances. It is also possible to use a mixture of any of the foregoing substances or their equivalents.

The use of gelatin as a stabilizer to "set" the juice is sometimes difficult to handle in the processing of certain fruits, such as strawberries, because of the tendency to develop a rubbery consistency.

Although it is preferable to heat the fruit juice and gel-forming substance in order to speed dispersion and hydration of the gel-forming substance, it is not necessary in every instance to heat the juice since some gel-forming substances, such as gum karaya, hydrate at a relatively low temperature. When the separated juice and gum mixture is heated, it is preferable not to heat the substances above 180° F. since at higher temperatures the flavor suffers.

Although the invention has been particularly concerned with a method of preparing whole fruit for use in ice cream, it should be understood that the invention is not limited to the preparation of ice cream products but may be used for and is intended to be applied in related arts wherein whole fruit or vegetables and parts thereof are used in the preparation of frozen food products.

In the specification and claims which follow the term "whole fruit" or "whole vegetable" is intended to include both the whole, uncrushed fruit or vegetable and also pieces cut therefrom which are not crushed or pureed.

Likewise, in the specification and claims which follow, wherever the term "slight gel" or "set" appears, it is intended to indicate a perceptible thickening of the liquid to form a somewhat heavy, viscous, syrup-like mass which may be readily handled and separated from the whole fruit if desired. It is not necessary nor desirable that a firm gelatinous mass be formed.

As described, the invention provides a greatly improved process for preparing a smooth, frozen food product containing whole fruit or parts thereof wherein the fruit does not form a crystalline structure.

Obviously, many modifications and variations of the invention as hereinbefore set forth may be made without departing from the spirit and scope thereof, and, therefore, only such limitations should be imposed as are indicated in the appended claims.

I claim:

1. A process of treating sweetened whole fruit used in frozen confection products, which comprises separating the fresh uncooked whole fruit from the fruit juice syrup formed when the said fruit is sweetened, dispersing throughout the fruit juice syrup a gel-forming substance, combining the fruit juice syrup containing the gel-forming substance with the whole fruit, and maintainng the gel-containing fruit juice syrup in contact with the said whole fruit until a slight gel is formed, whereupon the said fruit when introduced into a frozen confection will not have objectionable ice crystals in said fruit.

2. A process of treating sweetened whole fruit used in frozen confection products, which comprises separating the fresh uncooked whole fruit from the fruit juice syrup formed when the said fruit is sweetened, adding to the fruit juice syrup a gel-forming substance to stabilize said fruit juice syrup, heating the said fruit juice syrup not substantially above 200° F. to hasten the hydration and dispersion of the gel-forming substance throughout the said syrup, combining the previously separated whole fruit with the stabilized fruit juice syrup, and maintaining the said whole fruit in contact with the gel-containing fruit juice syrup until a slight gel is formed; whereupon the fruit is stabilized against the formation of objectionable ice crystals when the said fruit is incorporated in said frozen confection.

3. A process of treating sweetened whole fruit used in frozen confection products, which comprises separating the sweetened fresh uncooked whole fruit from the fruit juice syrup formed when the said fruit is sweetened, adding to the fruit juice syrup at least approximately 0.2 per cent of a gel-forming substance calculated on the weight of the sweetened fruit and fruit juice syrup, heating said fruit juice syrup and gel-forming substance not substantially above 200° F. to disperse the gel-forming substance throughout said syrup, combining the said whole fruit with the stabilized fruit juice syrup so that the said fruit is immersed in said fruit juice syrup, and maintaining the said whole fruit in contact with the gel-containing fruit juice syrup until a slight gel is formed; whereupon the whole fruit is stabilized against the formation of objectionable ice crystals when the said fruit is incorporated in said frozen confection.

4. A process of treating sweetened whole fruit used in frozen confection products, which comprises separating the partially sweetened fresh uncooked whole fruit from the fruit juice syrup formed when the said fruit is sweetened; adding to the fruit juice syrup between approximately 0.2 per cent and 3.0 per cent of a gel-forming substance based on the total weight of the said fruit, fruit juice syrup, and total sugar employed to sweeten the said fruit and form the fruit juice syrup; heating said fruit juice syrup and gel-forming substance to a temperature not substantially above 200° F. to uniformly disperse the gel-forming substance through said syrup; adding additional sugar to the said juice in order to sweeten to the desired degree; cooling the stabilized fruit juice syrup below approximately 100° F.; combining the said whole fruit with the stabilized fruit juice syrup so that the said fruit is immersed in said fruit juice syrup; and maintaining the said whole fruit in contact with the cool gel-containing fruit juice syrup until a slight gel is formed; whereupon the fruit is stabilized against the formation of objectionable ice crystals when the said fruit is incorporated in said frozen confection.

5. A process of treating sweetened whole fruit used in frozen confection products, which comprises separating the sweetened fresh uncooked whole fruit from the fruit juice syrup formed when the said fruit is sweetened, adding to the fruit juice syrup between approximately 0.2 and 3.0 per cent carrageen calculated on the weight of the combined fruit and fruit juice syrup, heating said fruit juice syrup and carrageen to a temperature not substantially above 200° F., cooling the carrageen-containing fruit juice syrup below approximately 100° F., combining the separated fruit with the stabilized fruit juice syrup so that the said fruit is immersed in said fruit juice syrup, and maintaining the said whole fruit in contact with the cooled carrageen-containing fruit juice syrup until a slight gel is formed.

6. In a process of treating fruit, the steps which comprise: dispersing through the fruit juice syrup formed when fresh uncooked whole fruit is sweetened a gel-forming substance which causes the fruit juice syrup to form a heavy viscous syrup on standing, and maintaining the fresh whole uncooked fruit immersed in said gel-containing heavy viscous syrup without destroying the fresh uncooked appearance of said fruit so that the fruit becomes stabilized against the formation of objectionable ice crystals when frozen.

JOHN W. KNECHTGES.

REFERENCES CITED

The following references are of record in the file of this patent:

UNITED STATES PATENTS

| Number | Name | Date |
|---|---|---|
| 2,002,963 | Schade | May 28, 1935 |
| 2,097,225 | Green et al. | Oct. 26, 1937 |
| 2,427,594 | Frieden et al. | Sept. 16, 1947 |

OTHER REFERENCES

Ser. No. 296,157, Herlow (A. P. C.), published May 4, 1943.